Patented Aug. 30, 1938

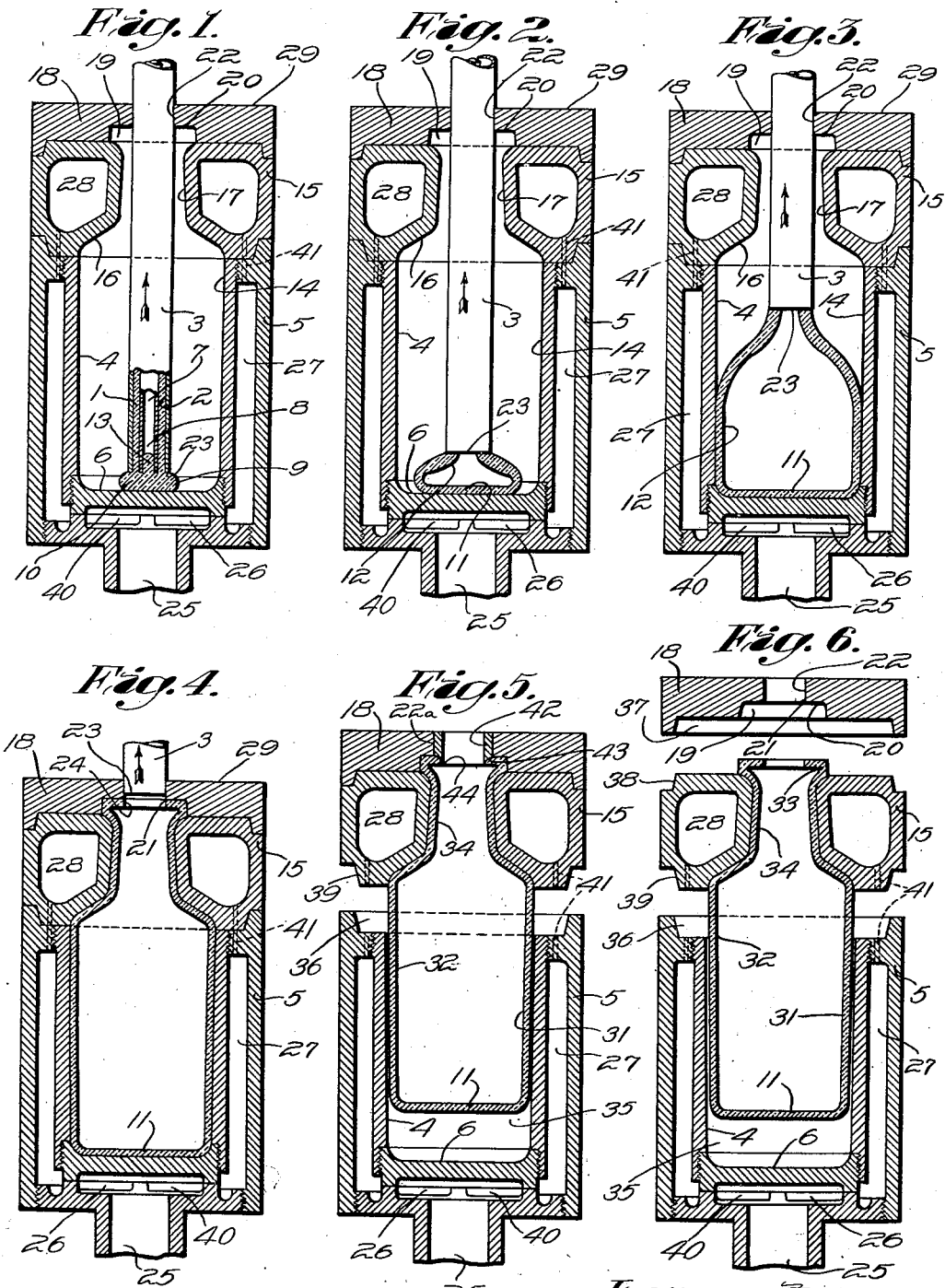

2,128,239

UNITED STATES PATENT OFFICE 2,128,239

PROCESS OF MOLDING PLASTIC MATERIALS

Enoch T. Ferngren, Toledo, Ohio, assignor, by mesne assignments, to Plax Corporation, Hartford, Conn., a corporation of Delaware Application February 25, 1933, Serial No. 658,486

26 Claims. (Cl. 18—55)

This invention relates to a process of blowing bottles and various other types of containers and shapes from materials in a plastic state.

The material used may be of any nature, but preferably it should be in a viscous deformable plastic state, and have physical properties such as are possessed by certain molten materials, semisolid solutions of matter and many organic materials dispersed in solvents and the like, and by plastic pastes, gels or sols, or by thermoplastic materials in general, by themselves, or when compounded and by many natural gums and synthetic products.

The method itself is partly an extrusion procedure and partly a synchronized distending operation on the extruding material while the same is received in, or is caused to cover the walls of a mold element, or is otherwise formatively restrained, or caused to assume a given shape.

The extruding process is capable of many modifications but as herein practiced, consists of advancing the plastic material as a hollow cylindrical stream, which stream is first caused to move confluently or to unite at a focus or point to form a tube closed at a point adjacent to the lower end of a receiving element or mold, and preferably near the bottom end of the mold cavity. By this means a predetermined mass of the plastic may be delivered upon the lower inner face of the mold used.

The extruding material is also moved lengthwise of the mold cavity in such fashion that the extruding point of the annular stream is progressively moved or caused to register with successive points of the mold cavity, the movement being continuous, or intermittent, or variable, as required. Following this action the hollow cylindrical stream or body is extruded at a rate which may vary depending upon the wall thickness desired for different parts of the article being formed.

In this connection if the girth or diameter at any one point or level of a mold cavity is more or less than at another point or level of the mold, the extruding stream velocity and its quantity may be suitably governed to insure proper thickness or strength of the container wall at all points or levels along the inner faces of the mold cavity. For example, in case of a bottle, the neck diameter is much less than the body diameter.

The distending operation by the introduction of compressed air or the like within the hollow extruding material takes place after the extruded annular mass has been closed at its end and assists in the subsequent and continuous extrusion of the material to progressively expand it to conformity with the walls of the mold. As the emitting point of the progressively extruding tubular body traverses the entire mold cavity and, as in case of a bottle mold, arrives at the neck and mouth forming section of the mold, the walls of the hollow extrusion are normally progressively forced outwardly and laid against the walls of the mold cavity, thus forming the walls of a completed bottle.

The distending or blowing agent may consist of a liquid or a gaseous medium under pressure, or it may be any fluid suitable for use with the material employed.

Compressed air may be considered as an example of any distending agent, in so far as its mechanical action on the extruding tubular stream is concerned. The air or gas used may be heated to a suitable degree, or cooled to a low temperature, and may carry along, mixed therewith, other gases or agents for chemical treatment of the material distended by the fluid pressure action.

In the making of the bottom and side walls of a bottle, jar, or other container structure from an extruding tubular stream of material of plastic consistency, the first object of the operation is to cause a closing or gathering together of the open forward end portion of the extruding tube to thereby provide a bottom wall for the hollow form which is to be distended, and so to speak, to form a gradually extruding bag which swells laterally as it is being extruded. The bottom wall of this bag is formed at the beginning of the extrusive action, and the side walls are thereafter progressively formed into a bag shape by the injection of a fluid distending medium during the extrusion.

To avoid a premature blowing out or progressive thinning of the wall formed of the plastic material comprising the forward closed end of the hollow tubular extrusion, it normally is desirable to afford support to the walls of the extruding envelope of material. This may be accomplished by extruding the tubular plastic stream and blowing the same adjacent to the bottom wall of the mold cavity, so that in effect, if a bottle is to be formed, the bottom portion thereof will first be formed. In other words the bottom portion of the extruding envelope of plastic material may first be caused to come into contact with the bottom of the mold before the side wall portions are expanded into contact with the side walls of the mold.

In the accompanying drawing I have shown, more or less diagrammatically, a number of apparatus elements including a mold and a blow pipe susceptible of use in anu illustrating the process of my invention. In the drawing:

Figure 1 is a view in vertical section of a bottle mold with a vertically movable tube inserted therein, showing how a hollow tubular extrusion or blank form of plastic material may be caused to move confluently at the point of extrusion from the tube.

Figure 2 is a similar view illustrating the step of laying the plastic material to produce the bottom wall of a container.

Figure 3 is a similar view showing the relation of the extrusion tube to the mold during an instant of its transit, the progressive extruding and distending of the plastic envelope in the hollow body formation, and the laying of the wall of the plastic material on the side wall of the mold cavity.

Figure 4 is a similar view showing the relative positions of the combination blow pipe and extrusion tube and the mold parts at the time of the completed extrusion and blowing of the material; also, the position at the time of severance of the extruded material relative to that which is within the extrusion tube.

Figure 5 is a similar view illustrating the mold parts separated for the purpose of lifting the body portion of the bottle free from the body forming portion of the mold. This figure illustrates a slightly modified form of the apparatus.

Figure 6 is a similar view showing how the bottle is held by the split neck mold sections before they are opened to release the bottle.

The plastics now available, ranging from coaltar and petroleum derivatives to casein and sugar derivatives, may be supplied from a compression chamber under suitable control as to direction, and at such speed and amount as desired or necessary, the equipment used for this purpose not being shown. The movement of the plastic material may also be reversed as may be necessary in carrying out the process.

In the practice of this process the plastic material 1 is first caused to be advanced from the passage 2 of the combination blow pipe and extrusion tube 3 after the tube 3 has been inserted into the mold cavity 4 of a body mold 5 relatively close to the bottom 6 of the mold, the parts being positioned about as shown in Figure 1.

As the plastic material is forced out from the passage 2 of tube 3, the close proximity of bottom wall 6 imparts a transverse spreading movement to the forward end of the tubular plastic material extrusion 9, causing this material both to mushroom out and to flow together to form a button 10, Figure 1, beneath the lower end of tube 3 and between said tube and the bottom wall 6. If at this instant some of the air in the central passage 7 of the tube 3 is evacuated, the external pressure of the normal atmosphere in the mold cavity 4 will cause the plastic tubular extrusion coming from passage 2 to flow into the lower end 8 of the passage 7, forming a stem 13 on the button 10, thus effectively producing a bottom portion or closed end on the tubular extrusion 9 as an inceptive step.

The bottom end wall 11 on this extruding tubular body 9 of the plastic material is formed as shown in Figure 2, where the extrusion tube 3 is being slightly elevated with respect to the bottom wall 6 of the mold cavity 4; and at this instant the first portion of the plastic bag or envelope 12 may also be said to be forming. This bag formation in reality is a hollow blank, and may be caused to form quite naturally, in as far as confluency is concerned, by the simple expedient of removing a portion of the tube which forms the passage 8, which will cause the extruding material to issue as a solid stream or gob from the lower end of tube 3 before the air is admitted.

The bottom wall 11 and the first part of the bag 12 are partly formed from the plastic button 10, and the stem 13 thereon as the tube 3 is elevated and air under pressure forces the plastic material, including the stem 13, from the passage 7. The stem 13 unites with the plastic material which comprises the prior confluent extrusion at this time, and simultaneously therewith, the tubular extrusion 9 of the plastic material is also advanced from the passage 2 during the elevation of the tube 3 from its close proximity to the wall 6, thus depositing both the extruding material and that which was previously extruded along the wall 6 of the mold, thereby forming the bottom wall 11 and the first portion of the side wall or bag 12.

The tube 3 is progressively raised relative to the bottom 6 of the mold 5, and the tubular extrusion 9 of the plastic material is also progressively advanced from the passage 2 at a rate and in a quantity to provide a proper wall thickness of the extruding bag. During this time the bag is progressively distended and pressed against the mold wall 14, about as shown in Figure 3, the required thickness of plastic material deposited along said walls being readily predetermined by suitable variations in the rate of elevation of the tube 3 and the quantity of material extruded from passage 2.

As the end of the tube 3 is moved upwardly away from the cavity 4 and enters the neck mold portion 15, it traverses the cavities 16 and 17 therein, and at this point the speed and quantity of material extruded from the passage 2 is progressively reduced, so that for instance, as the tube 3 moves through the cavity 16, there is caused a relatively rapid progressive point-by-point reduction in the rate of extrusion.

When the end of tube 3 enters the cavity 17 of the neck portion of the mold 15, the rate of extrusion becomes constant, until the tube 3 approaches the mold ring 18, a short distance below the wall 20 of the lip cavity 19 therein, where all extrusive action must cease. The air pressure from the passage 7 is then materially increased, to cause an instant cleavage and separation at point 21 between the compressed plastic material in cavity 19 and that material which remains in the passage 2 as the tube 3 is caused to quickly move out through the orificial passage 22 of the mold ring 18.

In some forms of operation, particularly when there is used a plastic material of a viscous gummy semi-solid nature, it will be advantageous to cause a recession or upward movement of the plastic material 1 through the passage 2 in the direction of movement of the tube 3 before the lower end of the tube, during its outward movement from the mold cavity, passes the point 21 at the corner of the lower face 20 and the orificial passage 22. The purpose of this is to cause a quick diminution of the extruding volume or quantity directly at the lower end of the tube 3 as the internal air pressure in the mold is being increased, so that the neck lip wall which is formed in cavity 19 may be more readily severed from the plastic material remaining in the tube passage 2, the air pressure acting to impart rigidity to the plastic material both in the tube and in the cavity 19.

As an aid to separation at the edge 21 between the plastic material in cavity 19 and that which is withdrawn into the passage 2, a quick rotational movement may be given to the tube 3 as its lower edge 23 passes the edge point 21 of the ring. The severance of the tubular supply stream 9 at the inner lip wall edge of the bottle may also be performed by a cylindrical cutting tool (not shown) located between the ring 18 and the tube 3.

Pressure of air, gas, steam, or liquid media may be applied to the plastic coating or wall thus placed in the mold, but such treatment should preferably be applied as a subsequent operation following immediately after the extrusion operation, as for instance, when a material of a thermo-setting nature, such as different condensation products, and plastics such as rubber compounds, are used.

In some instances, however, it is an advantage to apply air pressure directly from the tube 3 when the material is handled hot. With certain cellulose derivatives which are plastic when hot no additional heating is required in the mold and the only objective is to press the plastic wall formation of the bottle tightly against the inner face of the mold cavity to hold the shape of the plastic wall for an instant during the setting. The latter may be accomplished by chilling, but even this operation may of course be performed subsequent to the actual laying of the plastic material.

Some rubber compounds may be vulcanized during the spreading period for the plastic material by the injection of steam into the mold jackets at the time of extrusion, or the mold may be heated by the circulation of hot air through the cavities 26, 27 and 28, but when a heavier wall structure is to be vulcanized, subsequent or prolonged application of a heated atmosphere through the opening 22 in the ring 18 is the best procedure.

The best procedure in communicating internal pressure to the interior of the plastic article, is to firmly attach a pressure nozzle in a tightly fitting fashion to the upper surface 29 around the orifice 22, the period of association of the nozzle being predetermined according to the time required for the plastic to set into the required solid or semi-solid state.

The fluent temperature controlling medium which is used for cooling or heating the walls of the molds is admitted through the passage 25 into the space 26, from which it passes through a series of openings 40 into the space 27, from which it moves through ducts 41 into the space 28, from whence it then flows out through hollow hinge parts of the split neck mold 15, the latter parts not being shown herein.

The plastic material introduced into the mold as herein described, if of the cellulose derivative type, may be compounded with many synthetic resins and plasticizers such as tricresyl phosphate. The material is heated to a point of having fluid mobility under pressure before it is advanced from a supply chamber (not shown) through the passage 2 of the tube 3, which normally should be kept at a temperature sufficiently elevated to prevent chilling of the material. Benzyl cellulose may be thus prepared and used for extrusion when heated.

The mold parts may be retained at the same or a lower temperature, than that of the cellulose derivative plastic material extruded, and distended within the mold, but if quick setting to rigidity is wanted, the mold parts may be chilled to make such results almost instantaneous as the extruding bag 12 contacts with the walls of the mold cavity.

The air stream injected into the envelope or bag 12, if a heated cellulose plastic is used, should normally be of a slightly higher temperature than the material, but, depending on the speed of the entire association period of the tube 3 with the mold and the time elapsing between each such period, the temperature of the air may be lowered.

With thermo-setting, pre-conditioned, pre-heated semi-solid and mobile plastic compounds, the temperature and pressure of the distending media should as a rule be considerably elevated to produce the needed final reaction at the time the quickly extruding and enlarging tube of fluent plastic material is pressed against the walls of the molding cavity. The walls of the mold should be held within that known, fixed and predetermined temperature range at which the particular thermo-setting plastic material will solidify under the pressure of the distending media. Such plastic compounds may carry inorganic matter of non-plastic nature.

When rubber compounds are used to make hollow rubber goods by this process, the tube 3 should normally be held at a lower temperature than the compound, unless special attention is given to the material entering into the compounds; also in most cases the air or distending media should be cooled, although steam can be injected at the time of extrusion through the passage 7; if following such injection a low temperature fluid is passed through the passage to quickly chill the same before any material amount of heat has passed through the wall of tube 7 to affect the rubber compound.

After the hollow article is formed, the air, gas, or liquid used during subsequent internal pressure application may be highly heated, so that both side of the wall of rubber composition in the mold may attain the same degree of cure, the mold normally being heated for this purpose.

After the material comprising the bottle 31 has been set to the required firmness, the mold parts 15 and 18 are raised from the body mold 5, this operation being for the purpose of liberating the bottle body 32 from the mold cavity 4.

The next step consists of lifting the ring mold 18 away from the bottle brim 33. Following this, the split neck mold 15 is opened to release the neck portion 34, while the bottle 31 is positioned as shown in Figure 6.

As the neck mold opens, the bottle normally sinks into the cavity 4 of the mold 5, the weight of the container being partly supported by the air cushion 35 in the cavity 4.

During this reception of the bottle 31, the mold 5 may be turned laterally, or swung outwardly, the open end thereof being moved through an angle of ninety degrees so as to face in a horizontal direction instead of vertically, thus permitting the removal of the bottle from the mold, at which time means may be provided to give the edge of the bottle lip a smoothing down finish if needed.

The various mold parts are so related to one another that the air present in the molding cavities 4, 16, 17, and 19 may be withdrawn or escape during the association of the tube 3 with the cavities.

The mold parts 5, 15 and 18 may also have venting passages for the escape of gas or fluid.

The required resistance of atmosphere against and around the growing tubular plastic projection 9, as it progressively changes from the bag shape 12 into the bottle 31, may be closely controlled with the mold structure as shown, since the recessed portions 36 in the body mold and 37 in the ring mold firmly enclose and seal the split mold parts 15, locking the same tightly against one another, the end constructions 38 and 39 making this possible, so that relatively great pressure may be applied internally of the plastic article in the mold cavity, the mold parts otherwise being rigidly held from their mountings.

The step of causing or producing a confluent closing of the forward end of the extruding tubular stream 9 by aid of suction from the tube 7 inside of the tube 3 or by any other means can be brought about before the tube 3 reaches the lower position shown in Figure 1, and in fact at almost any point during the downward movement of the tube through the opening 22 and while it is passing downwardly through the mold cavity.

The gathering into a body of the walls of the extruding tube 9 may then be brought about by reducing the air pressure in the passage 7 at any predetermined instant, while simultaneously extruding the plastic material from the passage 2; both actions being caused to occur at the same moment the tube is moving downwardly or upwardly through the mold cavity. In some operations it is advantageous to cause this initial closing of the forward end of the hollow extruding body 9 in the space above or outside the mold ring 18, at which time the tube 3 may be stationary in the outside position relative to the mold or moving toward or away from the same.

If the initial extrusion and gathering together is caused to occur in the mold cavity space, the bag 12 may be formed very quickly and but little time consumed in laying the plastic wall and in moving the tube 3 out of the mold cavity, as the extruding bag 12 then is moving forwardly in advance of tube 3 as said bag is being blown and contacts with bottom wall 6 of the mold, thus making it possible to terminate the downward thrust of tube 3 at some point relatively high in the mold cavity space, as may be predetermined by adjustments of the pressure or impulse producing agencies which control the rate of extrusion of the plastic and the mechanical means which control the speed and variations and directions of movements of the tube 3.

The ring mold 18 may be provided with a tubular bushing part 42, the lower end of which forms a projecting knife edge 44 and the annular curvature 43. The object of the provision of the edge is to coact with the air compression in the mold during the retraction of the tube 3 at the moment when the extrusive action in passage 2 stopped or at the instant the plastic material in the passage 2 is caused to upwardly recede. This coaction between the cutoff means and the pressure of air inside of the molded plastic bag in the mold, as previously stated, should occur at the point 23 when the tube approaches closely the upper face 20 of the bottle mouth cavity 19.

The coaction between the air pressure and the shearing edge 44, under the conditions above described, produces a clean cut at the top of the resulting blown ware.

As the air pressure forces the extruded material against the edge 44, the sharp edge thereof progressively cuts through the plastic wall, the parent body of plastic material now being retracted and caused to return or move upwardly in the passage 2, with the result that the instantly cut tubular end of the extruded plastic material is then withdrawn or pushed into the tube 3, leaving a clean cut inner edge at the mouth of the bottle, which edge is also rounded by the annular curve 43, as shown in Figure 5. This entire operation of cutting or rather detaching the bottle from the parent body of plastic material should only occupy a very infinitesimal fraction of time i. e., as the tube 3 arrives with its edge 23 in alignment with the knife edge 44 and passes the same.

This process lends itself to producing good results in fixing lettering and raised figures on the walls of the containers formed. Ribbings, beads and other expedients for strengthening flexible or rigid plastic wall structures are also readily formed.

Extrudable plastic materials formed of cellulose derivatives, dispersions, and solutions of other plastic materials with solvents of volatile character, and with or without plasticizers, may also be handled by this process in the making of hollow articles, bottles and other containers. My process is operative with any plastic material which may be extruded and subsequently expanded by blowing, using any fluid material to stretch the film made therefrom without rupture, and which may thereafter be rigidified.

In handling plastic materials which contain solvents it is desirable that the proportion of solvents in the plastic mass be relatively low to prevent any tendency of the film coating to flow after it is laid in the mold. Plastic bodies having small percentages of solvents and plasticizers, which become fluent when heated, lend themselves to extrusive handling according to this process if the plastic body is heated to and preserved at proper temperature during handling to the point of extrusion.

As a general proposition such materials as cellulose acetate, benzyl cellulose and nitro-cellulose and the like may be handled in a non-fluent but pasty state and at temperatures which may be above the normal boiling point of the solvents employed providing the percentage of solvents is very low relative to the solid proportion of the plastic mass. The solvent probably exists in the plastic in the form of an absorbed vapor. The low solvent content prevents any tendency of the plastic to flow after it is laid in the mold and it insures a quick transition to solid form as the air pressure is applied against the film.

The method herein disclosed is not directed toward and is not restricted to any specific material, or limited thereby, although in the nature of things some materials may be found preferable from the standpoint of economy and intended uses.

Having briefly described the method without materially touching upon the many modifications possible, I desire to claim as my invention and to secure by Letters Patent.

I claim:

1. The process of making blown hollow articles from organic plastic materials which are expansible by blowing and thereafter capable of being rigidified, which comprises relatively moving an extrusion orifice and a mold cavity to bring the orifice into and toward a position adjacent to the bottom of the mold cavity and thereafter away from said bottom, causing a pressure-actuated extrusion of plastic material from said orifice during the aforesaid relative movement, simultaneously directing fluid under pressure through a second orifice within the first named orifice and into the interior of the plastic material to expand it, supporting the forward portion of said material on the bottom portion of said mold cavity as it is being expanded, and supporting the subsequently extruded portions of said material on the side walls of said mold cavity.

2. The process of making blown hollow articles from organic plastic materials which are expansible by blowing and thereafter capable of being rigidified, which comprises moving an extrusion orifice into and toward the bottom portion of a mold cavity and then outwardly through the cavity, causing a pressure-actuated progressive extrusion of the plastic material from said orifice as an annular body, closing the leading end of said annular body, directing fluid under pressure through a second orifice within the first named orifice and into the interior of the closed hollow body formed by extrusion as aforesaid to expand the same, supporting the forward portion of the body of plastic material on the bottom portion of the mold cavity as it is being expanded, and supporting the subsequently extruded and expanded portions of the hollow body on the side walls of the mold cavity.

3. The process of making blown hollow articles from organic plastic materials which are expansible by blowing and thereafter capable of being rigidified, which comprises confining a mass of such a plastic material in tubular form, introducing one end of said mass as thus formed into a mold, closing this end, applying pressure within the closed body of plastic material and simultaneously extruding the tubular mass into a mold, thereby producing an expanded globular body of the plastic material, continuing the expansion of said globular body until it contacts with the walls of the mold, relatively moving the remaining plastic material and the mold to withdraw such remaining plastic material from the mold, and rigidifying the extruded and expanded plastic material in position against the walls of the mold.

4. The process of making blown hollow articles from organic plastic materials which are expansible by blowing and thereafter capable of being rigidified, which comprises shaping a mass of plastic material into the form of a tube closed at one end and confined laterally, introducing the closed end of said tube into the mouth of a mold, extruding said tube into said mold, applying pressure within said tube to expand it into contact with the walls of the mold, and rigidifying the extruded plastic material in contact with the walls of said mold.

5. The process of making blown hollow articles from organic plastic materials which are expansible by blowing and thereafter capable of being rigidified, which comprises shaping a mass of plastic material into the form of a tube closed at one end and confined laterally within an extrusion member, introducing the closed end of the tube of plastic material into the mouth of a forming mold, extruding said tube into said mold, applying pressure within said tube to expand it into contact with the walls of the mold, progressively withdrawing the extrusion member from the mold during the extrusion and expansion of the plastic material at a rate varying in accordance with the desired wall thickness of the article to be produced, and rigidifying the extruded plastic material while in contact with the walls of said mold.

6. The process of making blown hollow articles from organic plastic materials which are expansible by blowing and thereafter capable of being rigidified, which comprises shaping a mass of plastic material into the form of a tube closed at one end and confined laterally within an extrusion member, introducing the closed end of the tube of plastic material into the mouth of a forming mold, extruding said tube into said mold, applying pressure within said tube to expand it into contact with the walls of the mold, progressively withdrawing the extrusion member from the mold during the extrusion and expansion of the plastic material as aforesaid, retracting the plastic material within the extrusion member to attenuate a connection between the portion of the plastic material in the mold and that within the extrusion member, causing a separation of the plastic material within the mold from that within the extrusion member at the attenuated part formed as aforesaid, and rigidifying the extruded plastic material within the mold in contact with the walls thereof.

7. The process of making blown hollow articles from organic plastic materials which are expansible by blowing and thereafter capable of being rigidified, which comprises moving the plastic material confined in tubular form into a mold of the shape of the finished article, causing the end of said tubular material to gather at a predetermined position in respect to the mold and thereby closing such end, applying pressure within the tube of material to cause it to move out against the walls of the mold, and rigidifying the plastic material in position against said walls.

8. The process of making blown hollow articles from organic plastic materials which are expansible by blowing and thereafter capable of being rigidified, which comprises moving the plastic material while in a plastic state in tubular form into a mold of the shape of the finished article, bringing the end of the tube of plastic material into contact with the bottom of the mold to close the end of the tube, and applying fluid under pressure to the interior of the closed tube to distend the walls thereof and bring them against the walls of the mold.

9. The process of making blown hollow articles from organic plastic materials which are expansible by blowing and thereafter capable of being rigidified, which comprises confining a mass of such a plastic material in tubular form, introducing one end of said mass as thus formed into a mold, closing the end of the tubular mass of plastic material in a manner which is at least assisted by producing a reduced pressure within the tubular mass of plastic material, applying pressure within the closed tubular mass of plastic material and simultaneously extruding the tubular mass into the mold, thereby producing an expanded globular body of plastic material, continuing the expansion of said globular body until it contacts with the walls of the mold, withdrawing any remaining plastic material from the mold, and rigidifying the extruded and expanded plastic material in position against the walls of the mold.

10. The process of making blown hollow articles from organic plastic materials which are expansible by blowing and thereafter capable of being rigidified, which comprises forming such a plastic material into a tubular form confined both internally and externally by an extrusion member which terminates in an annular extrusion orifice and has a central blowing orifice, closing the leading end of the tubular form of plastic material in a manner including retracting some of the plastic material into said central orifice and thereby causing said plastic material to issue from said annular orifice as a closed-ended, hollow stream upon extrusion, moving said closed ended, hollow stream in an advancing stroke followed by a retracting stroke in such manner that it enters and approaches the bottom of a mold cavity during the advancing stroke, blowing through said central orifice to expand the closed-ended, hollow stream, continuing said extrusion and blowing operations during said retracting stroke, and controlling these operations to produce within the interior of said mold cavity a hollow blown article.

11. The process of making hollow articles from organic plastic materials which are expansible by fluid pressure and thereafter capable of being rigidified, which comprises the steps of shaping the plastic material into an extrusion body of tubular form with an open end for subsequent extrusion, closing said end, extending said extrusion body by further extrusion, expanding the extended extrusion by the application of fluid pressure applied within said extended extrusion to bring the distended extrusion into contact with a confining mold cavity, and separating the resulting hollow article from any remaining plastic material in said extrusion body.

12. The process of claim 11, including the further step of reducing the thickness of the wall between the hollow article and the parent extrusion body of plastic material prior to separating the hollow article from said parent extrusion body.

13. The process of claim 11, wherein the hollow article is separated from the plastic material of the parent extrusion body by cutting the same.

14. The process of claim 11, wherein the hollow article is separated from the plastic material of the parent extrusion body by arresting the flow of plastic material from said parent extrusion body and cutting with a cylindrical cutting member surrounding said extrusion body of plastic material.

15. The process of claim 11, wherein the hollow article is separated from the plastic material of the parent extrusion body by stopping the extrusive action on said plastic material while applying fluid pressure within the hollow article.

16. The process of claim 11, wherein a rotational movement of the parent extrusion body is applied during separation of the hollow article from the plastic material of the parent extrusion body.

17. The process of claim 11, wherein a relative rotational movement between the parent extrusion body of plastic material and the formed article in the mold is employed to at least assist in separating the article from the parent body of plastic material.

18. The process of making blown hollow articles from organic plastic materials which are expansible by blowing and thereafter capable of being rigidified, which comprises the steps of forming a tubular extrusion body having an open end, closing this open end by extruding the plastic material against a molding surface to bring the annular edge of the extrusion body together and unite the material, extending said extrusion body by further extrusion, and expanding the extended extrusion through the application of pneumatic pressure applied within said extended extrusion to bring the distended extrusion into contact with a confining mold cavity, whereupon it rigidifies in situ.

19. The process of making hollow articles from organic plastic materials which are expansible by fluid pressure and thereafter capable of being rigidified, which comprises extruding such a plastic organic material from an annular orifice in tubular shape and closing the leading end of the extruded plastic tube, applying fluid pressure within the plastic tube during extrusion and while the tube is still in a moldable state, and expanding the plastic material by means of the fluid pressure into conformity with the confines of a mold, thereby forming a hollow article.

20. The process of making hollow articles from organic plastic materials which are expansible by fluid pressure and thereafter capable of being rigidified, which comprises closing the leading end of a tubular body of such material, extruding the closed-ended tubular body from an annular orifice, applying fluid pressure within the extruded closed-ended body while it is still in a moldable state, and expanding the closed-ended body by means of the fluid pressure into conformity with the confines of a mold, thereby forming a hollow article.

21. The process of making hollow articles from organic plastic materials which are expansible by fluid pressure and thereafter capable of being rigidified, which comprises providing a mass of such plastic material in a state of workable plasticity, preforming a portion of said mass while still in a state of workable plasticity into a closed-ended hollow body, expanding said preformed material in a mold by fluid pressure before the material thereof has been converted to a state of rigidity, rigidifying the expanded material in position in the mold, and separating the hollow article thus formed from the remainder of said mass.

22. The process of making blown hollow articles from organic plastic materials which are expansible by blowing and thereafter capable of being rigidified, which comprises providing an unformed mass of such plastic material in a condition of plasticity as to be expansible by pneumatic pressure, expanding a portion of said material within a mold by pneumatic pressure, maintaining said portion of said material in a condition of expansible plasticity until it conforms to the shape of the mold, rigidifying said portion of the material in position in the mold, and separating the blown hollow article thus formed from the remainder of said mass.

23. The process of making blown hollow articles from organic plastic materials which are expansible by blowing and thereafter capable of being rigidified, which comprises preshaping a portion of a mass of such an organic plastic material, while in a plastic state, into a closed-ended hollow body, delivering said pre-shaped body before it has been converted to a state of rigidity and without substantial change of shape, into a mold, expanding said body to conform to the shape of the mold while it is still in a plastic state, rigidifying the expanded material in position against the walls of the mold, and separating the blown hollow article thus formed from the remainder of said mass.

24. The process of forming hollow containers from organic plastic material which is expansible by blowing and capable thereafter of being rigidified, which comprises the step of expanding such a plastic material into conformity with the confines of a mold cavity by the use of a fluid medium chemically reactive with at least one constituent of the organic plastic material being used, whereby simultaneously to expand and chemically treat the plastic material by the action of the expanding fluid.

25. The process of forming hollow containers from organic plastic material which is expansible by blowing and capable thereafter of being rigidified, including the steps of simultaneously extruding a previously unformed mass of such material as a closed ended hollow form into a mold cavity, and expanding the closed ended hollow form of the plastic material to the shape of the mold cavity by the use of preheated air.

26. The process of forming hollow articles from organic plastic material which is expansible by blowing and thereafter capable of being rigidified, which comprises forming an expansible plastic blank from and integral with an unformed parent body of such material, expanding the blank by blowing in a mold prior to the rigidification of the material, and severing the article thus formed from the parent body of said material, the blown article thus formed being initially rigidified in situ in the mold.

ENOCH T. FERNGREN.